US008125175B2

(12) United States Patent
Yoneda et al.

(10) Patent No.: US 8,125,175 B2
(45) Date of Patent: Feb. 28, 2012

(54) ELECTRIC STEERING SYSTEM

(75) Inventors: Atsuhiko Yoneda, Utsunomiya (JP);
Yasuo Shimizu, Shimotsuke (JP);
Takashi Miyoshi, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 627 days.

(21) Appl. No.: 12/273,973

(22) Filed: Nov. 19, 2008

(65) Prior Publication Data

US 2009/0128081 A1 May 21, 2009

(30) Foreign Application Priority Data

Nov. 21, 2007 (JP) ................................ P2007-302086

(51) Int. Cl.
*H02P 6/08* (2006.01)
(52) U.S. Cl. ................... 318/689; 318/432; 318/400.15; 318/400.01; 318/700
(58) Field of Classification Search .................. 318/689, 318/432, 400.15, 400.01, 700
See application file for complete search history.

(56) References Cited

U.S. PATENT DOCUMENTS

| 5,569,990 | A | 10/1996 | Dunfield | |
|---|---|---|---|---|
| 6,002,234 | A * | 12/1999 | Ohm et al. | 318/729 |
| 6,836,090 | B2 * | 12/2004 | Sugiyama et al. | 318/437 |
| 7,141,948 | B2 * | 11/2006 | Kifuku et al. | 318/432 |
| 7,161,317 | B2 * | 1/2007 | Matsushita et al. | 318/432 |
| 2002/0117990 | A1 | 8/2002 | Sawada et al. | |
| 2004/0008006 | A1 | 1/2004 | Imai et al. | |
| 2008/0035411 | A1 | 2/2008 | Yamashita et al. | |
| 2009/0128081 | A1 | 5/2009 | Yoneda et al. | |

FOREIGN PATENT DOCUMENTS

| EP | 1 315 280 | A2 | 5/2003 |
|---|---|---|---|
| EP | 1 507 330 | A2 | 2/2005 |
| EP | 1 583 217 | A1 | 10/2005 |
| EP | 1 588 925 | A2 | 10/2005 |
| EP | 1 796 257 | A1 | 6/2007 |
| EP | 1 841 056 | A1 | 10/2007 |
| JP | 04-359691 | A | 12/1992 |
| JP | 07-245981 | | 9/1995 |
| JP | 3312472 | | 5/2002 |
| JP | 2004-312834 | A | 11/2004 |
| JP | 2006-304478 | A | 11/2006 |
| JP | 2007-261520 | A | 10/2007 |
| JP | 2007-267548 | A | 10/2007 |
| JP | 2007-307940 | A | 11/2007 |

* cited by examiner

OTHER PUBLICATIONS

Yamamoto, et al. "Method of Estimation Initial Magnetic-Pole Position of Surface Magnet Synchronous Motor using Pulse Voltage," IEEJ Trans IA, 2005, p. 253-258, vol. 125, No. 3. Kaneko, et al., "Method of Estimating Initial Position of IPM Motor in Stationary State," IEEJ Trans. IA, 2003, p. 140-148, vol. 123, No. 2.

*Primary Examiner* — Walter Benson
*Assistant Examiner* — David Luo
(74) *Attorney, Agent, or Firm* — Arent Fox LLP

(57) ABSTRACT

An electric steering system is provided with: a steering torque detection unit which detects a steering torque acting on the shaft; a brushless motor which includes a rotor and a stator having multi-phase stator coils, and generates an assisting torque for assisting the steering torque; a current supply switching unit which drives the brushless motor; a rotary angle estimation unit which outputs an estimated rotary angle; a determination unit which determines whether or not the estimated rotary angle is appropriate by comparison with a direction of the steering torque; and a steering control unit which drives the brushless motor in accordance with the estimated rotary angle determined to be appropriate by the determination unit to control generation of the assisting torque.

5 Claims, 12 Drawing Sheets

ELECTRIC STEERING SYSTEM

Priority is claimed on Japanese Patent Application No. 2007-302086, filed Nov. 21, 2007, the contents of which are incorporated herein by reference.

BACKGROUND OF THE INVENTION

1. Field of the Invention

The present invention relates to an electric steering system.

2. Description of the Related Art

Conventionally, for example, a method which applies a pulse voltage that does not cause a rotation of a rotor to a brushless motor is known when a magnetic-pole rotary angle of the rotor from a magnetic-pole position (i.e., a predetermined reference rotary position) in a stationary state of the brushless motor. In this method, a rotor angle (i.e., the magnetic-pole rotary angle of the rotor from the predetermined reference rotary position) indicating a rotor position is estimated on the basis of a variation in inductance in accordance with a salient-pole property of the rotor based on an inductance obtained by Fourier Transformation from a current and a voltage of the brushless motor (for example, see Non-Patent Document 1: YAMAMOTO et al., "Method of Estimating Initial Magnetic-Pole Position of Surface Magnet Synchronous Motor using Pulse Voltage", IEEJ Trans. IA, Vol. 125, No. 3, 2005, p 253-258).

However, it is not possible to distinguish N and S poles by observing the inductance variation. For this reason, as shown in FIG. 4 of Non-Patent Document 1, the inductance varies by two amplitudes for each electric angle. This inductance variation inevitably occurs in a case where the rotor position is estimated on the basis of the inductance variation as well as a case of the method of Non-Patent Document 1.

When starting the motor in a state where the N and S poles are inverted by mistake, the brushless motor may rotate in a reverse direction. For this reason, for example, a method which supplies a current saturating a magnetic circuit so as to determine N and S poles of a rotor and a starting direction thereof based on an inductance being dissymmetric with respect to the N and S poles of the rotor in accordance with the magnetic saturation is known (for example, see Non-Patent Document 2: KANEKO et al., "Method of Estimating Initial Position of IPM Motor in Stationary State", IEEJ Trans. IA, Vol. 132, No. 2, 2003, p 140-148).

However, in the above-described method according to an example of the related art (Non-Patent Document 2), since a large current saturating the magnetic circuit is excessively supplied in order to determine the magnetic pole of the rotor, an unnecessary torque is generated in the brushless motor. For this reason, in the brushless motor provided in the electric steering system, a problem arises in that a driver feels an discomfort due to unexpected steering torque, vibration, or noise.

Additionally, it is necessary to carry out a complex process such as a PLL process. From this point, a problem arises in that it is difficult to reduce a time necessary for determining polarity and it is not possible to improve responsiveness upon starting the brushless motor. In the brushless motor provided in the electric steering system, a steering assisting force generated from the brushless motor cannot appropriately assist a driver's steering input, thereby causing a problem in that a driver feels discomfort.

The present invention is contrived in consideration of the above-described circumstances, and an object of the invention is to provide an electric steering system capable of promptly starting a brushless motor being in a stationary state and of preventing a driver from feeling discomfort when steering while ensuring desired low noise.

SUMMARY OF THE INVENTION

In order to solve the above-described problems and to achieve the object, the present invention adopts the following configuration.

An electric steering system according to the present invention is provided with: a steering torque detection unit which detects a steering torque acting on the shaft; a brushless motor which includes a rotor and a stator having multi-phase stator coils, and generates an assisting torque for assisting the steering torque; a current supply switching unit which drives the brushless motor by switching a current supply between each phase stator coil; a rotary angle estimation unit which estimates a rotary angle of the rotor of the brushless motor and outputs an estimated rotary angle; a determination unit which determines whether or not the estimated rotary angle is appropriate by comparison with a direction of the steering torque detected by the steering torque detection unit; and a steering control unit which drives the brushless motor in accordance with the estimated rotary angle determined to be appropriate by the determination unit and controls generation of the assisting torque.

It may be arranged such that the electric steering system is further provided with a state quantity detection unit which detects a predetermined state quantity involved with an inductance of the brushless motor, wherein the rotary angle estimation unit includes: a rotary angle candidate estimation section which estimates a plurality of rotary angle candidates as the rotary angle of the rotor based on the predetermined state quantity detected by the state quantity detection unit; and a selection section which selects one of the plurality of rotary angle candidates estimated by the rotary angle candidate estimation section as the estimated rotary angle.

It may be arranged such that the state quantity detection unit includes: a voltage application section which applies a predetermined AC voltage to each multi-phase stator coil; and a voltage detection section which detects a line voltage or an interphase voltage of each phase, and detects the predetermined state quantity based on a ratio of the line voltage or a ratio of the interphase voltage detected by the voltage detection section in a state where the predetermined AC voltage is applied to each multi-phase stator coil by the voltage application section.

With the electric steering system according to the present invention, it is determined whether or not the estimated rotary angle is appropriate based on the steering torque detected by the torque detection unit provided in the electric steering system in a state where the brushless motor is controlled to be driven by the predetermined current in accordance with the estimate rotary angle. Then, the brushless motor is started on the basis of the estimated rotary angle which is determined to be appropriate. For this reason, since it is possible to prevent a complex process for estimating the rotary angle of the brushless motor, it is possible to reduce a time necessary for estimating the rotary angle and to improve responsiveness upon starting the brushless motor. Also, since it is possible to appropriately assist a driver's steering input by means of the steering assisting force generated by the brushless motor, it is possible to prevent a case in which a driver feels discomfort when steering. Additionally, it is determined whether or not the estimated rotary angle is appropriate based on the steering torque detected by the steering torque detection unit provided in the electric steering system. For this reason, it is possible to prevent a complex configuration of the apparatus without, for example, requiring a new component to be configured.

It may be arranged such that the determination unit controls driving of the brushless motor in a state where the steering torque detected by the steering torque detection unit is less than or equal to a predetermined torque.

In this case, it is possible to prevent a case in which a driver feels discomfort when steering due to an unnecessary excessive torque exceeding a predetermined torque upon controlling the brushless motor by using a predetermined current in accordance with the estimated rotary angle.

It may be arranged such that the steering torque detection unit is a magnetostrictive torque sensor.

In this case, since the magnetostrictive torque sensor has rigidity relatively larger than that of, for example, a torque sensor for detecting torsion of a torsion bar connecting an input side to an output side of a steering shaft, it is possible to improve responsiveness with respect to the steering torque variation. For this reason, even when the brushless motor is controlled to be driven by the predetermined current, it is possible to detect the steering torque with high sensitivity without a delay. Accordingly, it is possible to reliably carry out a process for determining whether or not the estimated rotary angle is appropriately selected in a short time. Thus, it is possible to prevent a case in which a driver feels discomfort when steering when an assisting torque is delayed due to a start delay of the brushless motor.

DETAILED DESCRIPTION OF THE INVENTION

Hereinafter, an electric steering system according to an embodiment of the present invention will be described with reference to the accompanying drawings.

Figure 1:
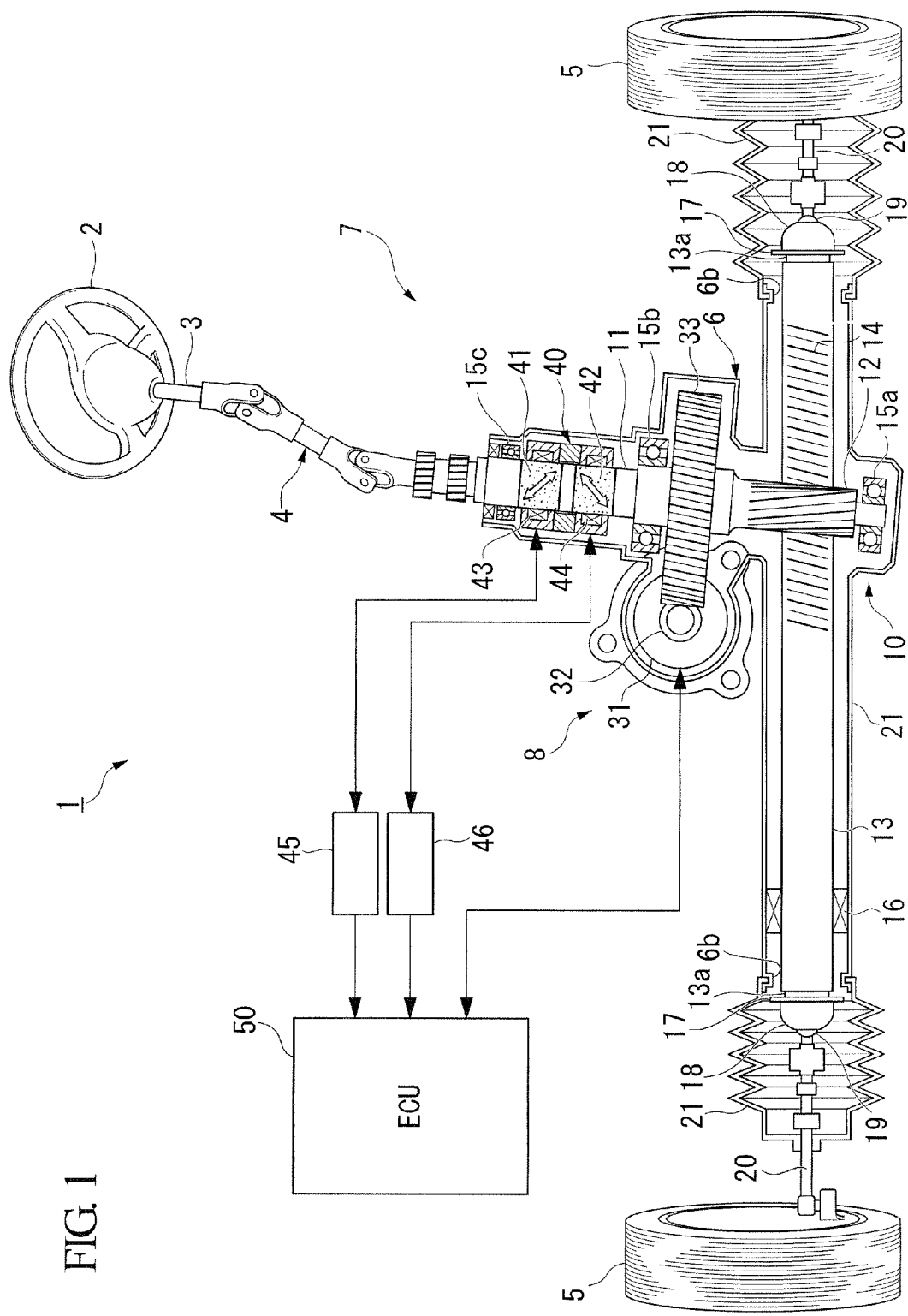
FIG. 1 is a configuration diagram showing an electric steering system according to an embodiment of the present invention.

For example, as shown in FIG. 1, an electric steering system 1 according to the embodiment includes a steering shaft 3 connected to a vehicle's steering wheel 2, a universal joint 4 connected to the steering shaft 3, a steering mechanism 7 accommodated in a housing 6 constituting a steering gear box, and a steering assisting mechanism 8 for generating a steering assisting force for the steering mechanism 7 in a steering system from the universal joint 4 to wheels 5 and 5.

The steering mechanism 7 includes a rack and pinion mechanism 10, and a pinion shaft 11 of the rack and pinion mechanism 10 is connected to the universal joint 4.

A pinion 12 provided in the pinion shaft 11 is engaged to a rack 14 provided in a rack shaft 13 capable of reciprocating in a vehicle width direction.

For example, the pinion shaft 11 is supported so that a lower portion, an intermediate portion, and an upper portion thereof are rotatable via bearings 15a, 15b, and 15c, respectively, and the pinion 12 is provided in a lower end portion of the pinion shaft 11.

The rack shaft 13 is supported to the inside of a rack housing 6a substantially having a cylindrical shape and extending in a vehicle width direction of the housing 6 so as to be capable of reciprocating in an axial longitudinal direction via a bearing 16.

Both ends of the rack housing 6a are provided with an opening, and an end portion 13a of the rack shaft 13 protrudes from the opening.

A rack end plate 17 having a larger outer diameter than that of the rack shaft 13 is fixed to each end portion 13a of the rack shaft 13, and a rack end head 18 is fixed to the rack end plate 17.

The rack end head 18 is provided with a ball joint 19, a tie rod 20 is connected to the ball joint 19, and then the wheel 5 is linked to the tie rod 20.

An annular concave groove 6b is formed in an outer peripheral surface in the vicinity of the openings of both ends of the rack housing 6a so as to protrude inward in a radial direction.

The annular concave groove 6b of the rack housing 6a is mounted with an end portion of a rack end cover 21 having an accordion shape and capable of being telescopic in an axial longitudinal direction of the rack shaft 13. The end portion 13a of the rack shaft 13, the rack end plate 17, the rack end head 18, and the ball joint 19 are accommodated in the rack end cover 21, and the tie rod 20 protrudes outward via the rack end cover 21.

The steering assisting mechanism 8 includes a motor 31 having a brushless motor used to generate a steering assisting force for reducing a steering force of the steering wheel 2, a worm gear 32, and a worm-wheel gear 33. The worm gear 32 and the worm-wheel gear 33 are accommodated in the housing 6 constituting the steering gear box.

The motor 31 is connected to the worm gear 32 axially supported to the housing 6, and the worm gear 32 is fitted to the worm-wheel gear 33 integrally formed with the pinion shaft 11. The worm gear 32 and the worm-wheel gear 33 constitute a deceleration mechanism, and a torque generated from the motor 31 becomes double by means of the worm gear 32 and the worm-wheel gear 33 to be thereby transmitted to the pinion shaft 11.

A magnetostrictive steering torque sensor 40 for detecting a steering torque (steering input) based on a magnetic characteristic variation caused by magnetostriction is disposed between the bearing 15b at the intermediate portion and the bearing 15c at the upper portion of the pinion shaft 11.

The steering torque sensor 40 includes two magnetostrictive films 41 and 42 provided in an outer peripheral surface of the pinion shaft 11, two detecting coils 43 and 44 disposed while being opposed to the magnetostrictive films 41 and 42, and detection circuits 45 and 46 connected to the detecting coils 43 and 44. Each of the detection circuits 45 and 46 converts each inductance variation of the detecting coils 43 and 44 caused by the magnetostriction into a voltage variation, and outputs the voltage variation to an ECU (Electric Control Unit) 50. The ECU 50 calculates the steering torque acting on the steering shaft 3 based on the outputs of the detection circuits 45 and 46.

The ECU 50 determines a target current to be supplied to the motor 31 in accordance with the magnitude of the steering torque detected by the steering torque sensor 40 (i.e., the steering torque input when a driver steers the steering wheel 2). By allowing the current supplied to the motor 31 to be equal to the target current, for example, by performing a control such as a PID control, an assisting torque is generated from the motor 31 in accordance with a steering torque, and the assisting torque is transmitted to the pinion shaft 11 via the deceleration mechanism. Accordingly, the steering assisting force generated by the motor 31 is applied in the same direction as the driver's steering direction, thereby steering the wheel 5 by means of a combination torque obtained by adding the driver's steering torque to the assisting torque of the motor 31.

Figure 2:
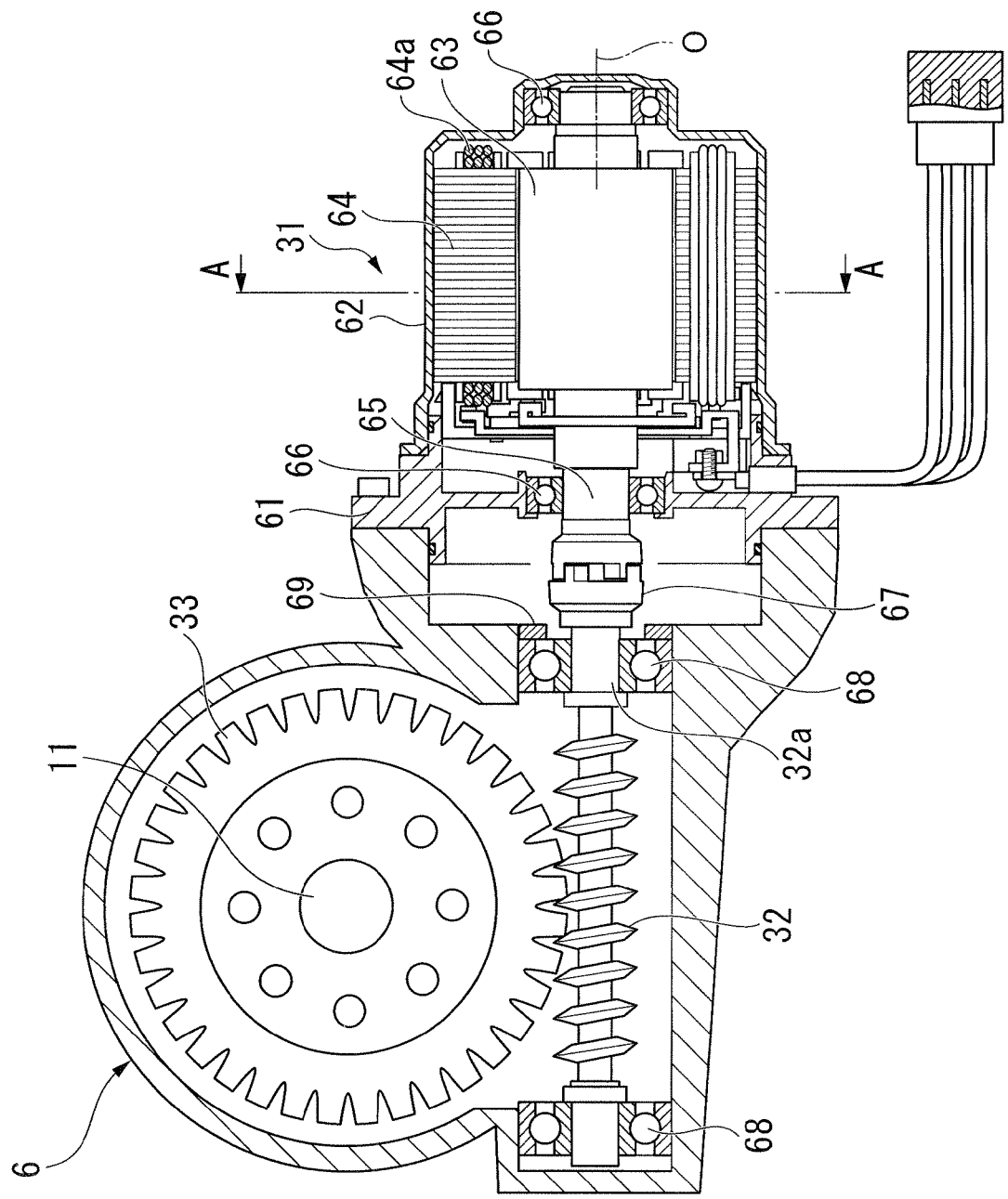
FIG. 2 is a configuration diagram showing a steering assisting mechanism of the electric steering system according to the embodiment of the present invention.

For example, as shown in FIG. 2, the motor 31 is mounted to a side portion of the housing 6 by means of a bolt so as to protrude from the housing 6. The motor 31 is rotatable in a circumferential direction about a rotary shaft O of a lid 61 for closing a side opening of the housing 6 and a cylindrical motor case 62 having a bottom mounted to the lid 61 by means of a bolt. Additionally, the motor 31 includes a rotor 63 having a permanent magnet 63a and a stator 64 covering an outer peripheral portion of the rotor 63 while being opposed thereto in a radial direction and having multiple-phase stator coils 64a for generating a rotary magnetic field rotating the rotor 63.

For example, the stator 64 is accommodated in the motor case 62 by means of press-inserting or the like, and an output shaft 65 is fixed to an inner peripheral portion of the rotor 63 so as to be disposed coaxially with the rotary shaft O.

The lid 61 and the motor case 62 of the motor 31 rotatably support the output shaft 65 via two bearings 66.

Figure 3:
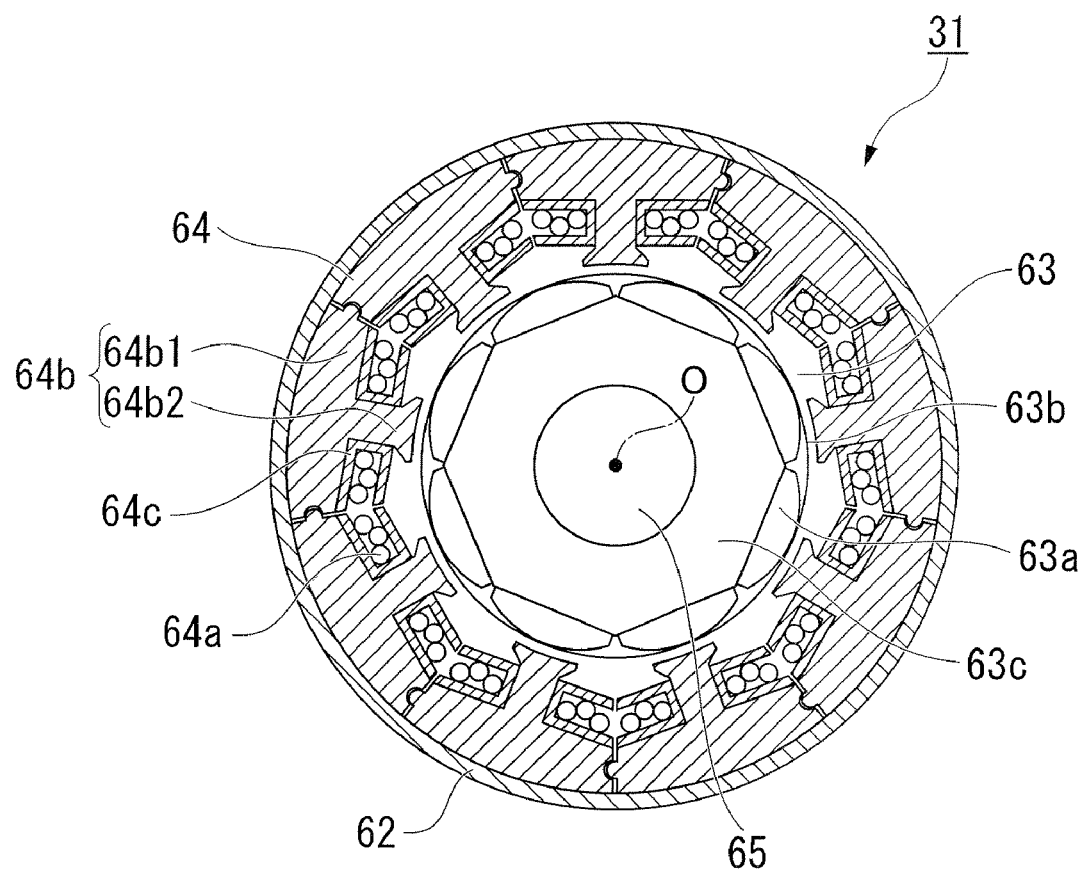
FIG. 3 is a cross-sectional diagram taken along the line A-A shown in FIG. 2.

For example, as shown in FIG. 3, the stator 64 of the motor 31 includes a plurality of split cores 64b arranged in an annular pattern, insulation bobbins 64c, and the stator coils 64a multiply wound around the bobbins 64c. For example, the stator 64 is accommodated in the motor case 62 formed by a press-forming process or the like by press-inserting.

For example, each split core 64b is formed by laminating a plurality of T-shaped silicon steel plates along a direction of the rotary shaft O and includes an outer peripheral-side yoke portion 64b1 and an inner peripheral-side teeth portion 64b2. In both end surfaces of the yoke portion 64b1 in a circumferential direction, one end surface is provided with a convex portion protruding in a circumferential direction and the other end surface is provided with a concave portion to which the convex portion is fitted. In the split cores 64b and 64b adjacent to each other in a circumferential direction, the convex portion of one yoke portion 64b1 is fitted to the concave portion of the other yoke portion 64b1, thereby forming the annular yoke. A width of the teeth portion 64b2 is smaller than that of the yoke portion 64b1 in a circumferential direction, and the teeth portion 64b2 protrudes from the yoke portion 64b1 to the rotor 63 located inside in a radial direction. The teeth portion 64b2 is mounted with the bobbin 64c formed of, for example, insulation resin material or the like.

For example, the rotor 63 of the motor 31 includes the permanent magnets 63a, a magnet cover 63b, a back yoke 63c, and the output shaft 65.

For example, the back yoke 63c having a substantially cylindrical shape is formed by laminating a plurality of annular silicon steel plates along a direction of the rotary shaft O, and includes the output shaft 65 mounted to an inner peripheral portion and the plurality of permanent magnets 63a arranged in an outer peripheral surface in a circumferential direction with a predetermined interval therebetween. The magnet cover 63b is disposed so as to cover an outer peripheral surface of the plurality of permanent magnets 63a.

For example, as shown in FIG. 2, the output shaft 65 of the motor 31 is connected to a worm shaft 32a of the worm gear 32 via a coupling 67.

The worm shaft 32a is disposed coaxially with the output shaft 65 of the motor 31 so as to be rotatably supported in the housing 6 via two bearings 68. One bearing 68 on the side of the motor 31 among the two bearings 68 mounted to the inside of the housing 6 is regulated from moving to the motor 31 in an axial longitudinal direction by a fixed ring 69.

Figure 4:
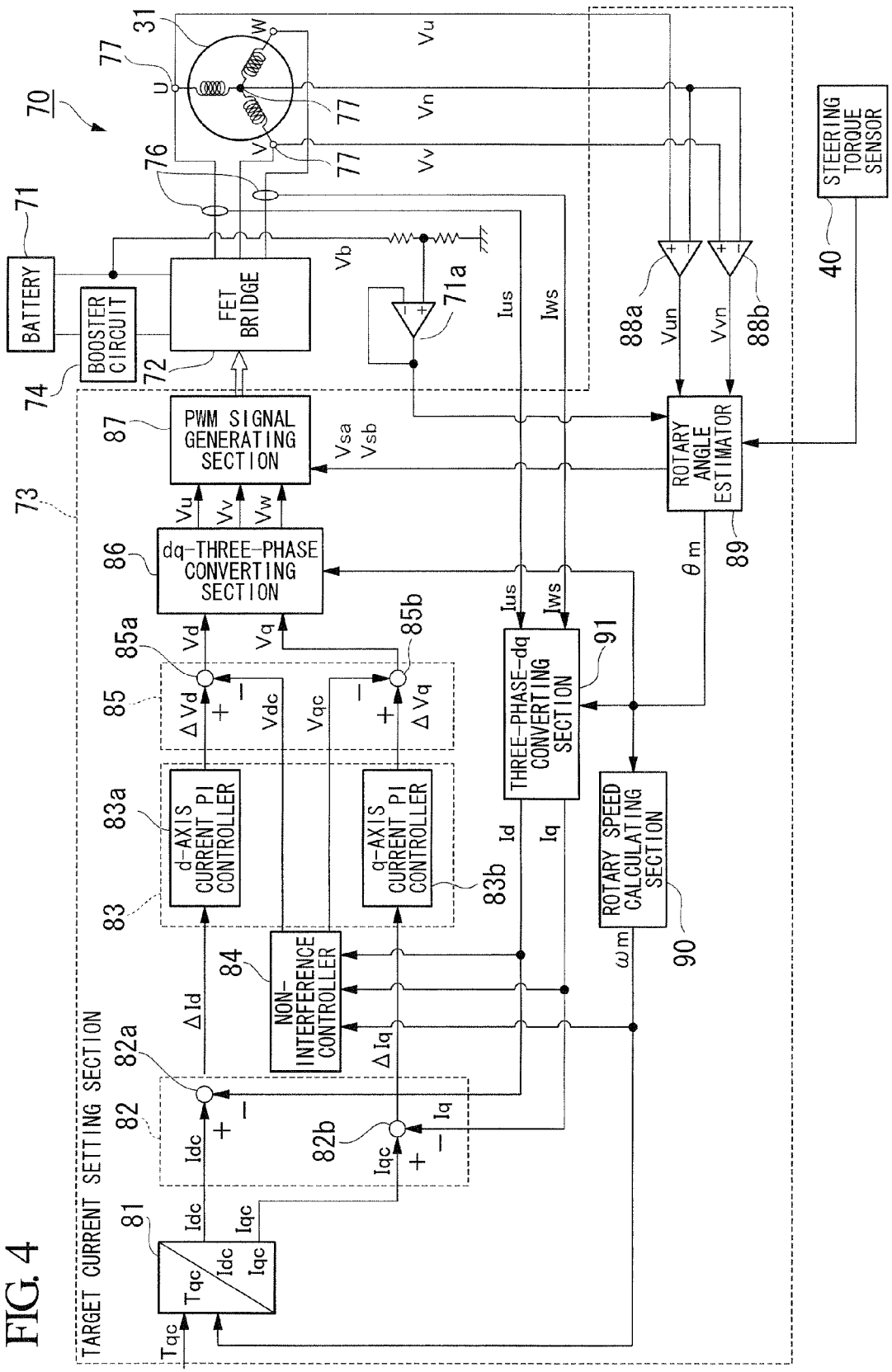
FIG. 4 is a configuration diagram showing a control device of a brushless motor according to the embodiment of the present invention.

In the electric steering system 1 according to the embodiment, for example, as shown in FIG. 4, a control device 70 of the motor includes an FET bridge 72 using a battery 71 as a DC power source and a control unit 73, which are provided in the ECU 50.

In the control device 70 of the motor, the motor 31 is driven by the FET bridge 72 upon receiving a control command output from the control unit 73.

Figure 5:
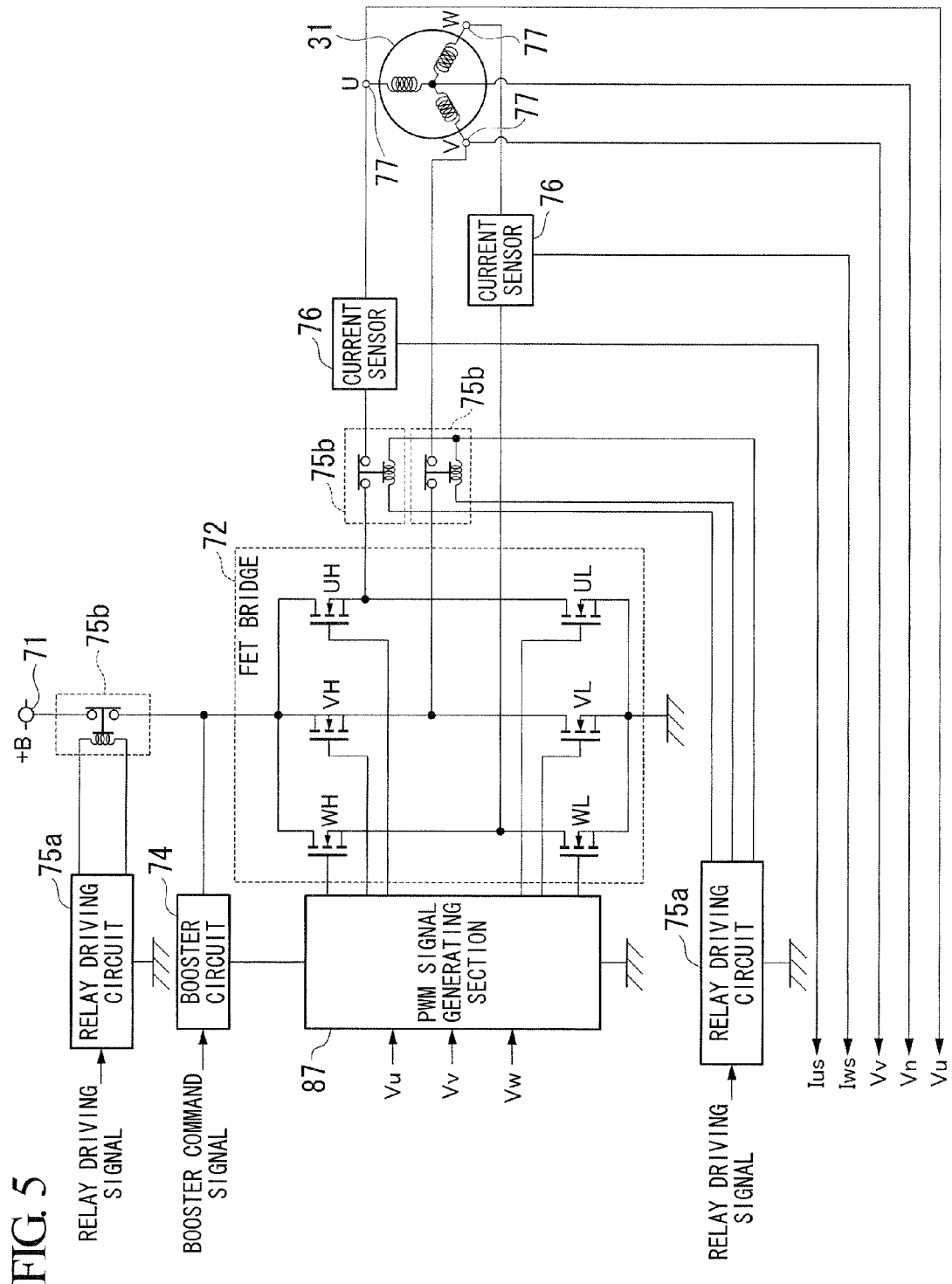
FIG. 5 is a configuration diagram showing an FET bridge shown in FIG. 4.

For example, as shown in FIG. 5, the FET bridge 72 includes a bridge circuit having a plurality of FETs (for example, MOSFET: Metal Oxide Semi-conductor Field Effect Transistor) connected in a bridge, and the bridge circuit is driven by a signal subjected to a pulse width modulation (PWM).

For example, the bridge circuit is formed in such a manner that a pair of High-side and Low-side U-phase transistors UH and UL, a pair of High-side and Low-side V-phase transistors VH and VL, and a pair of High-side and Low-side W-phase transistors WH and WL are connected to each other in a bridge. Each drain of the transistors UH, VH, and WH is connected to the battery 71 (+B) to form a High-side arm and each source of the transistors UL, VL, and WL is grounded to form a Low-side arm. Each source of the transistors UH, VH, and WH of the High-side arm is connected to each drain of the transistors UL, VL, and WL of the Low-side arm.

For example, the FET bridge 72 changes an ON/OFF state of each pair of transistors based on a gate signal (i.e., a PWM signal) as a switching command output from the control unit 73 to each gate of the transistors UH, VH, WH, UL, VL, and WL upon driving the motor 31. Accordingly, a DC power supplied from the battery 71 is converted into a three-phase AC power, and a current is sequentially supplied to the three-phase stator coils 64a, thereby supplying an AC U-phase current Iu, an AC V-phase current Iv, and an AC W-phase current Iw to the respective phase stator coils 64a.

A booster circuit 74 includes, for example, a charge pump circuit having a condenser and a transistor. The control unit 73 inputs a gate signal (i.e., a signal for commanding a booster operation of the booster circuit 74) for changing the ON/OFF state of the transistors.

The booster circuit 74 boosts each gate voltage of the transistors UH, VH, and WH forming the High-side arm of the FET bridge 72.

One relay 75b opened or closed by a relay driving circuit 75a is provided between the battery 71 and the FET bridge 72 and the booster circuit 74. Also, two relays 75b are provided between the FET bridge 72 and the stator coils 64a and 64a of the two phases (for example, U phase and V phase) among the three phases of the motor 31. The control unit 73 inputs a relay driving signal for controlling an opening/closing operation of the relay 75b to the relay driving circuit 75a.

The control unit 73 performs a feedback control of a current in a d-q coordinate forming a rotary orthogonal coordinate. For example, the control unit 73 calculates a d-axis target current Idc and a q-axis target current Iqc from a torque command Tqc or the like set in accordance with a signal output from the steering torque sensor 40 based on the steering torque input when the driver steers the steering wheel 2. Then, the control unit 73 calculates three-phase output voltages Vu, Vv, and Vw based on the d-axis target current Idc and the q-axis target current Iqc, and inputs a PWM signal as a gate signal to the FET bridge 72 in accordance with the phase output voltages Vu, Vv, and Vw. Also, the control unit 73 performs a control for making zero a deviation between the target d-axis and q-axis currents Idc and Iqc and the d-axis and q-axis currents Id and Iq obtained by converting the detection values of the actual phase currents Iu, Iv, and Iw supplied from the FET bridge 72 to the motor 31 into the d-q coordinate.

For example, in order to supply a current having a sine wave shape upon starting the motor 31, the control unit 73 compares the phase output voltages Vu, Vv, and Vw with a carrier signal such as a triangular wave so as to generate the gate signal (i.e., the PWM signal) for turning on or off the transistors UH, VH, WH, UL, VL, and WL of the FET bridge 72. The FET bridge 72 changes an ON/OFF state of the pair of three-phase transistors so as to convert the DC power supplied from the battery 71 into the three-phase AC power. Then, when the current is sequentially supplied to the stator coils 64a of three phases of the motor 31, the AC U-phase current Iu, the AC V-phase current Iv, and the AC W-phase current Iw are supplied to the stator coils 64a.

The control unit 73 previously stores an ON/OFF ratio map (data), that is, a duty of the PWM signal for turning on or off each of the transistors UH and UL, VH and VL, and WH and WL.

For this reason, the control unit 73 receives a detection signal (for example, a U-phase detection current Ius, a W-phase detection current Iws, and the like) output from a current sensor 76 for detecting at least two of the phase currents Iu, Iv, and Iw (for example, the U-phase current Iu, the W-phase current Iw, and the like) supplied from the FET bridge 72 to the respective phase stator coils 64a of the motor 31. Additionally, the control unit 73 receives a detection signal (for example, the U-phase voltage Vu, the V-phase voltage Vv, the middle-point voltage Vn, and the like) output from a voltage sensor 77 for detecting at least two of the phase output voltages Vu, Vv, and Vw (for example, the U-phase voltage Vu, the V-phase voltage Vv, and the like) necessary for estimating a rotary angle θm (i.e., a rotary angle of a magnetic pole of the rotor 63 from a predetermined reference rotary position, and a rotary position of the output shaft 65 of the motor 31) of the rotor 63 of the motor 31 used for, for example, a coordinate conversion or the like, and for detecting a voltage (a middle-point voltage) Vn of a middle point connected to the multiple-phase stator coils 64a of the motor 31.

The control unit 73 includes, for example, a target current setting section 81, a current deviation calculating section 82, a current control section 83, a non-interference controller 84, a voltage correcting section 85, a dq-three-phase converting section 86, a PWM signal generating section 87, first and second interphase voltage calculating sections 88a and 88b, a rotary angle estimator 89, a rotary speed calculating section 90, and a three-phase-dq converting section 91.

The target current setting section 81 calculates a current command for designating the phase currents Iu, Iv, and Iw supplied from the FET bridge 72 to the motor 31 based on a torque command Tqc and a rotary speed ωm of the motor 31 output from the rotary speed calculating section 90. The current command is output to the current deviation calculating section 82 in a form of the d-axis target current Idc and the q-axis target current Iqc in the rotary orthogonal coordinate.

The d-q coordinate forming the rotary orthogonal coordinate rotates in synchronization with the rotary phase of the rotor 63, where the d-axis (field axis) denotes a magnetic-flux direction of a field pole by the permanent magnet of the rotor 63 and the q-axis (torque axis) denotes a direction forming a right angle with the d-axis. Accordingly, as a current command for an AC signal supplied from the FET bridge 72 to each phase of the motor 31, the d-axis target current Idc and the q-axis target current Iqc as DC signals are supplied.

The current deviation calculating section 82 includes a d-axis current deviation calculating part 82a for calculating a deviation ΔId between the d-axis target current Idc and the d-axis current Id, and a q-axis current deviation calculating part 82b for calculating a deviation ΔIq between the q-axis target current Iqc and the q-axis current Iq.

The current control section 83 includes a d-axis current PI controller 83a for calculating a d-axis voltage command value ΔVd by controlling and amplifying the deviation ΔId and a q-axis PI current controller 83b for calculating a q-axis voltage command value ΔVq by controlling and amplifying the deviation ΔIq by means of, for example, a PID (Proportional-Integral-Derivative) operation.

The non-interference controller 84 calculates a d-axis compensation term Vdc and a q-axis compensation term Vqc, which cancel interference components for the d-axis and the q-axis in order to independently control the d-axis and the q-axis by canceling speed electromotive force components which interfere between the d-axis and the q-axis based on, for example, the d-axis current Id, the q-axis current Iq, a d-axis inductance Ld, and a q-axis inductance Lq which are stored in advance.

The voltage correcting section 85 includes a d-axis voltage calculating part 85a for obtaining a d-axis voltage command value Vd by subtracting the d-axis compensation term Vdc from the d-axis voltage command value ΔVd and a q-axis voltage calculating part 85b for obtaining a q-axis voltage command value Vq by subtracting the q-axis compensation term Vqc from the q-axis voltage command value ΔVq.

The dq-three-phase converting section 86 converts the d-axis voltage command value Vd and the q-axis voltage command value Vq in the d-q coordinate into the U-phase output voltage Vu, the V-phase output voltage Vv, and the W-phase output voltage Vw in the three-phase AC coordinate as a stationary coordinate based on the rotary angle θm corresponding to the rotary position of the motor 31 output from the rotary angle estimator 89.

The PWM signal generating section 87 compares the phase output voltages Vu, Vv, and Vw with a carrier signal such as a triangular wave and generates the gate signal (i.e., the PWM signal) for turning on or off the transistors UH, VH, WH, UL, VL, and WL of the FET bridge 72 in order to supply a current having a sine wave shape upon starting the motor 31.

The PWM signal generating section 87 outputs a predetermined gate signal having pulses for turning on or off the transistors UH, VH, WH, UL, VL, and WL of the FET bridge 72 in accordance with, for example, a command signal Vsa output from the rotary angle estimator 89 described below upon estimating the rotary angle in a stationary state of the motor 31. The predetermined gate signal commands the FET bridge 72 so that an AC voltage having a predetermined rectangular wave is applied between the phase terminals (for example, between the U-phase terminal and the V-phase terminal) of the motor 31, where the predetermined rectangular wave corresponds to a rectangular wave of a predetermined voltage value (for example, 12 V or the like) having a frequency (for example, 40 kHz or the like) double the PWM frequency (for example, 20 kHz or the like) upon driving the motor 31, except for an audio frequency.

The PWM signal generating section 87 outputs the predetermined gate signal having pulses for turning on or off the transistors UH, VH, WH, UL, VL, and WL of the FET bridge 72 in accordance with the phase output voltages Vu, Vv, and Vw generated by the steering torque, for example, when there is a command signal Vsb output from the rotary angle estimator 89 even upon selecting a single estimation value from a plurality of candidates of the rotary angle θm as described above at a rotary angle estimation time of the motor 31 in a stationary state.

Specifically, the predetermined gate signal sets a single estimate value θm from a plurality of candidates of the rotary angle θm described below as a temporary estimate value. The PWM signal generating section 87 commands the FET bridge 72 to drive the motor 31 by supplying a predetermined minute current thereto in an assisting dead band so that the steering assisting force is applied in the same direction as the driver's steering direction by use of the temporary estimate value.

The PWM signal generating section 87 outputs a signal for commanding the booster operation of the booster circuit 74 (for example, the gate signal or the like for changing the ON/OFF state of each transistor of the charge pump circuit provided in the booster circuit 74).

The first and second interphase voltage calculating sections 88a and 88b are provided with an operational amplifier. In terms of the phase output voltages Vu and Vv and the middle-point voltage Vn detected by the voltage sensors 77, the first interphase voltage calculating section 88a calculates a U-interphase voltage Vun(=Vu−Vn), and the second interphase voltage calculating section 88b calculates a V-interphase voltage Vvn(=Vv−Vn).

The rotary angle estimator 89 selects a plurality of candidates of the rotary angle θm in terms of the interphase voltages Vun and Vvn output from the first and second interphase calculating sections 88a and 88b. A single estimate value θm from the plurality of candidates is set as a temporary estimate value. The motor 31 is driven by supplying a predetermined minute current thereto in the assisting dead band so that the steering assisting force of the motor 31 is applied in the same direction as the driver's steering direction by use of the temporary estimate value. At this time, it is determined whether or not the temporary estimate value is correct based on the steering torque Tq output from the torque sensor 40, and then the estimate value of the correct rotary angle θm is output.

First, when the value of the U-interphase voltage Vun or the V-interphase voltage Vvn is smaller than a predetermined value, an induced voltage is not generated by the rotation of the motor 31, and thus the rotary angle estimator 89 estimates that the motor 31 is in a stationary state.

Figure 6A:
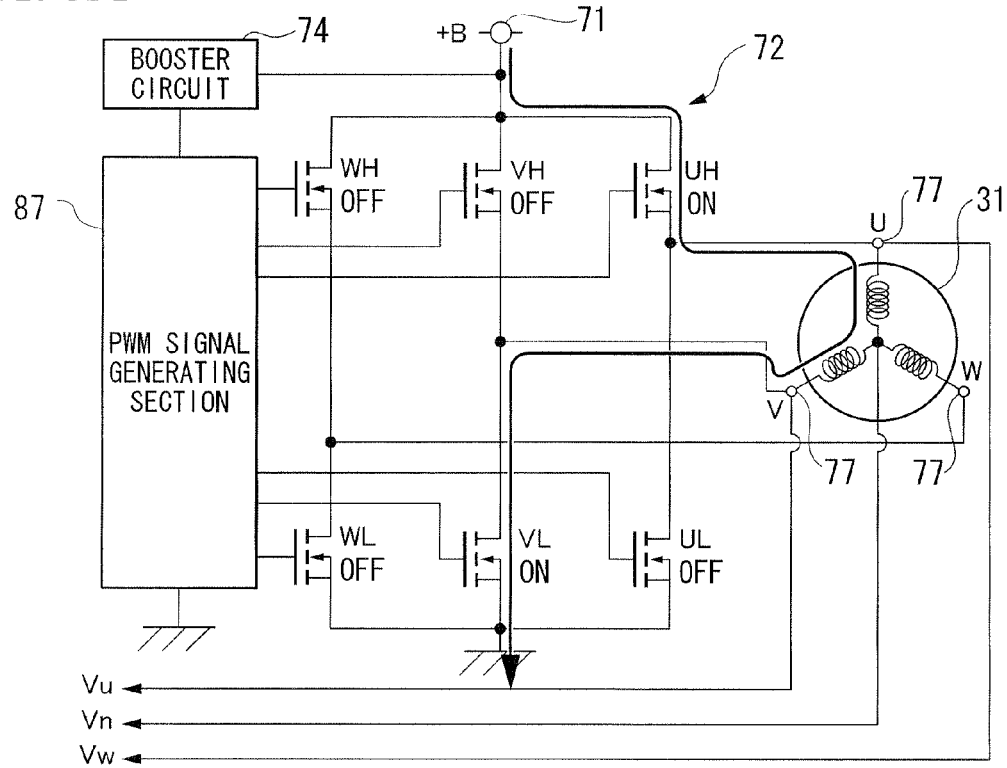
FIG. 6A is a diagram showing an ON/OFF state of each transistor of the FET bridge shown in FIG. 4.
Figure 6B:
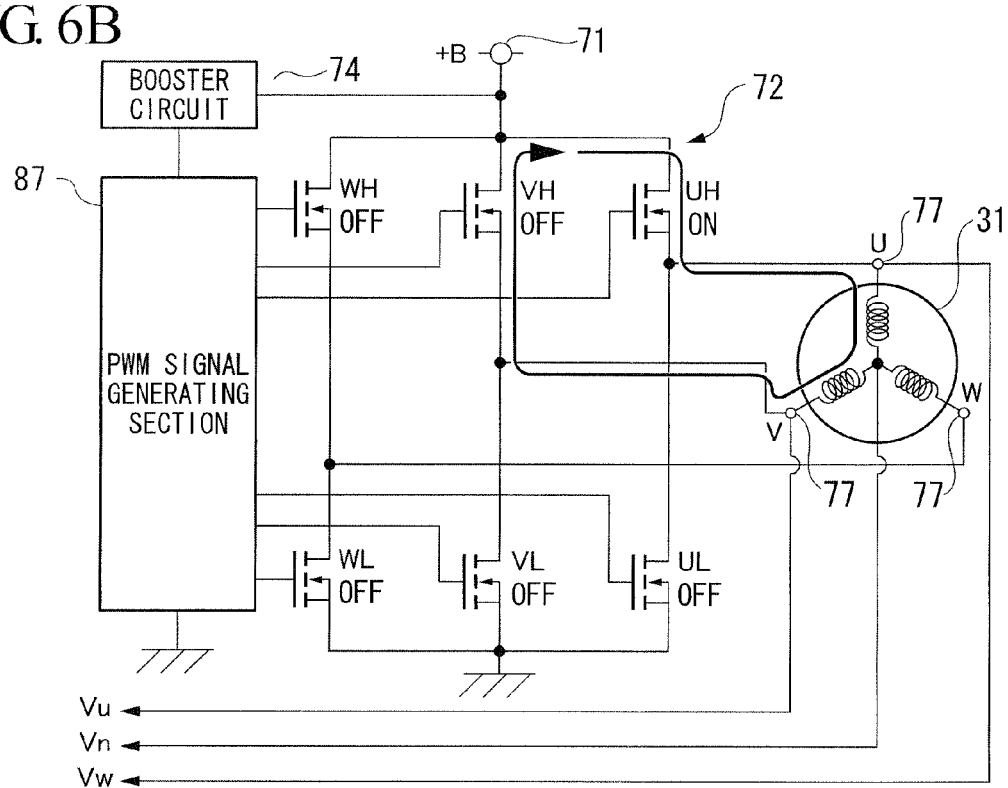
FIG. 6B is a diagram showing an ON/OFF state of each transistor of the FET bridge shown in FIG. 4.

For example, in the rotary angle estimation when the motor 31 is in a stationary state, the motor 31 is driven by repeating two states of the transistors UH, VH, WH, UL, VL, and WL of the FET bridge 72, where one state is shown in FIG. 6A in which the High-side U-phase transistor UH and the Low-side V-phase transistor VL are turned on, but the other transistors VH, WH, UL, and WL are turned off, and the other state is shown in FIG. 6B in which the High-side U-phase transistor UH is turned on, but the other transistors VH, WH, UL, VL, and WL are turned off. Accordingly, the rotary angle estimator 89 outputs the command signal Vsa for commanding to apply the AC voltage of the predetermined rectangular wave (for example, 40 kHz and 12 V) between the U-phase terminal and the V-phase terminal of the motor 31. On the basis of the ratio (interphase voltage ratio) Vun/Vvn between the U-interphase voltage Vun and the V-interphase voltage Vvn when the predetermined rectangular wave is applied between the U-phase terminal and the V-phase terminal of the motor 31, for example, the rotary angle θm is obtained by searching a predetermined first map set in advance.

Figure 7:
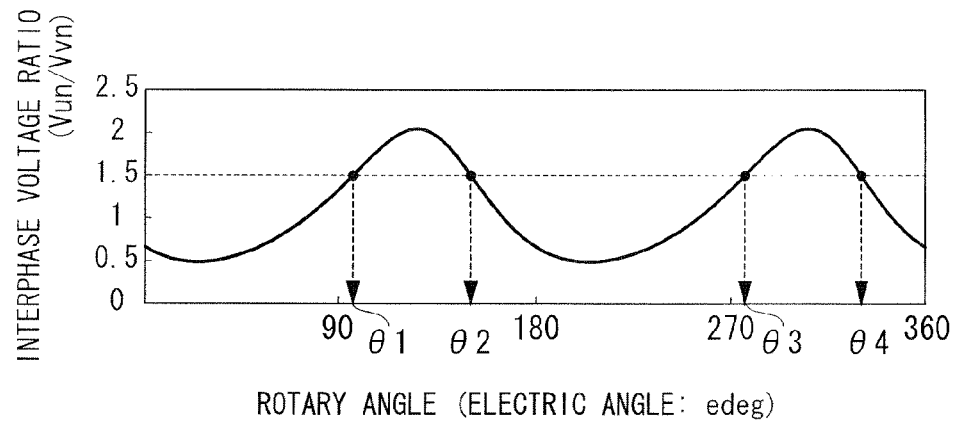
FIG. 7 is a graph showing a correspondence relationship between a rotary angle θm and an interphase voltage ratio Vun/Vvn according to the embodiment of the present invention.

The first map is, for example, a map showing a predetermined correspondence relationship between the interphase voltage ratio Vun/Vvn and the rotary angle θm. For example, as shown in FIG. 7, four values θ1, θ2, θ3, and θ4 of the rotary angle θm correspond to the appropriate single value of the interphase voltage ratio Vun/Vvn in an electric angle (edeg) in the range of 0° to 360°. That is, two cycles of the interphase voltage ratio Vun/Vvn are set to 360° in the electric angle (edeg). For example, in the case of the interphase ratio Vun/Vvn=1.5, the correspondence is such that the rotary angle θm=θ1(=100°), θ2(=150°), θ3(=280°), and θ4(=330°).

The rotary angle estimator 89 selects two of the four values θ1, θ2, θ3, and θ4 of the rotary angle θm searched by the first map by searching, for example, a predetermined second map set in advance based on the V-interphase voltage Vvn when the predetermined rectangular wave is applied between the U-phase terminal and the V-phase terminal of the motor 31.

Figure 8:
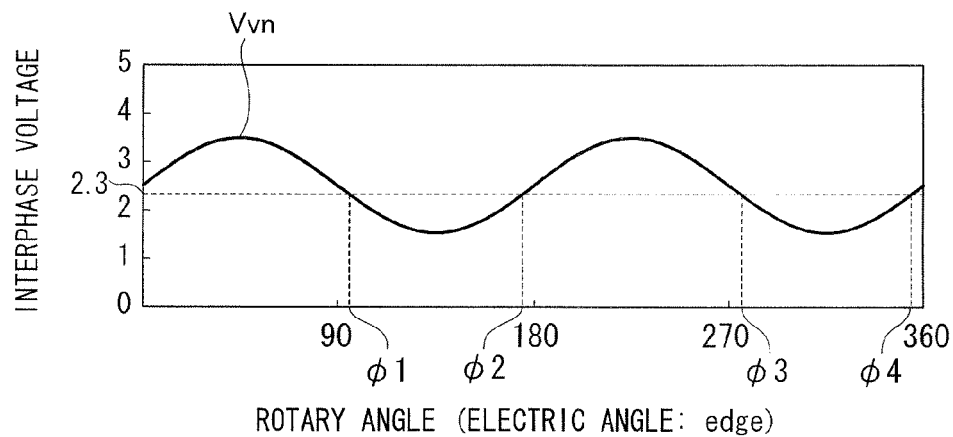
FIG. 8 is a graph showing a correspondence relationship between a rotary angle θm and an interphase voltage Vvn according to the embodiment of the present invention.

The second map is, for example, a map showing a predetermined correspondence relationship between the V-interphase voltage Vvn and the rotary angle θm. For example, as shown in FIG. 8, four values φ1, φ2, φ3, and φ4 of the rotary angle θm correspond to the appropriate single value of the V-interphase voltage Vvn in the electric angle (edeg) in the range of 0° to 360°. That is, two cycles of the interphase Vvn are set to 360° in the electric angle (edeg).

In order to obtain the accurate rotary angle θm even when a battery voltage (i.e., a power source voltage of the FET bridge 72) varies, a battery voltage Vb is detected, the V-interphase voltage Vvn is corrected using the battery voltage Vb, and the second map is searched using the corrected V-interphase voltage Vvn, thereby obtaining the four values φ1, φ2, φ3, and φ4 of the rotary angle θm. For this reason, for example, as shown in FIG. 4, a voltage follower circuit 71a having an operational amplifier is provided between the rotary angle estimator 89 and the battery 71 (+B), and the output of the voltage follower circuit 71a is input to the rotary angle estimator 89.

For example, when the V-interphase voltage Vvn=2.3 upon obtaining the interphase voltage ratio Vun/Vvn=1.5, the rotary angle satisfying the V-interphase voltage Vvn is such that the rotary angle θm=φ1(=100°), φ2(=175°), φ3(=280°), and φ4(=355°).

For this reason, when the four values θ1(=100°), θ2(=150°), θ3(=280°), and θ4(=330°) of the rotary angle θm are searched by the first map, two values θ1(=100°) and θ3(=280°) of the rotary angle θm equal to the detection result of the second map are selected as the estimate value candidate.

In the ON/OFF state change of the FET bridge 72, for example, when a current is supplied to the U-phase and V-phase stator coils 64a, a current supplied to the U-phase stator coil 64a becomes equal to that supplied to the V-phase stator coil 64a. From this point, the interphase voltage ratio Vun/Vvn is equal to an impedance ratio Zun/Zvn as shown in the following Equation (1). In the impedances Zun(=Run+j·ω·Lun) and Zvn(=Rvn+j·ω·Lvn), since an angular frequency ω(ω=2πf and f=40 kHz) is sufficiently large, coil resistances Run and Rvn become sufficiently smaller than reactances (ω·Lun) and (ω·Lvn), respectively. For this reason, the interphase voltage ratio Vun/Vvn becomes substantially equal to the interphase inductance ratio Lun/Lvn.

Figure 9:
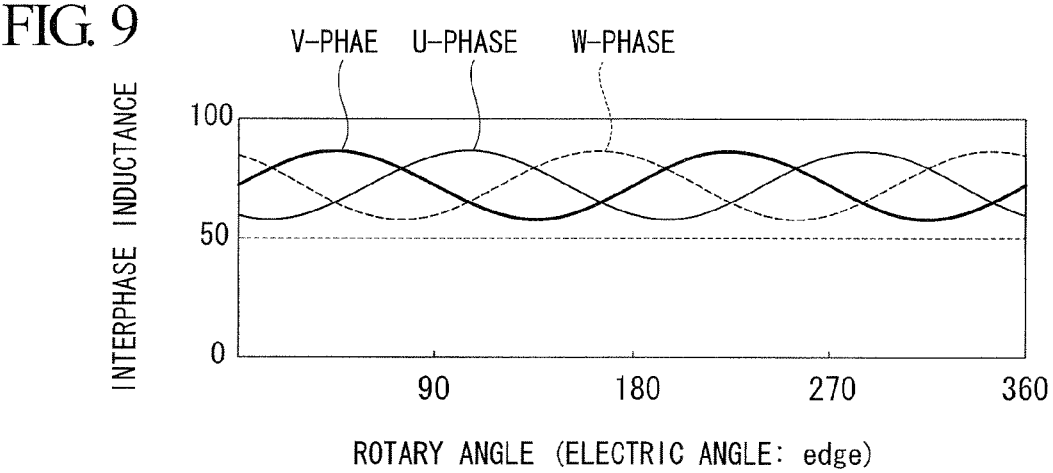
FIG. 9 is a graph showing a correspondence relationship between a rotary angle θm and each of interphase inductance Lun, Lvn, and Lwn according to the embodiment of the present invention.

For example, as shown in FIG. 9, the interphase inductances Lun, Lvn, and Lwn vary in accordance with the rotary angle θm while having a phase difference of 120° in the electric angle (edeg) due to a salient-pole property of the motor 31, and two cycles of the variation are set to 360° in the electric angle (edeg).

In FIG. 9 showing a variation in inductance of the motor 31, for example, an average value of the interphase inductances Lun, Lvn, and Lwn is about 72 μH, and the interphase inductances Lun, Lvn, and Lwn vary between a minimum value (for example, 58 μH) and a maximum value (for example, 86 μH).

Accordingly, it is possible to detect the rotary angle θm from the interphase voltage ratio Vun/Vvn substantially equal to the interphase inductance ratio Lun/Lvn.

[Equation 1]

$$\frac{Vun}{Vvn} = \frac{Zun}{Zvn} = \frac{Run + j \cdot \omega \cdot Lun}{Rvn + j \cdot \omega \cdot Lvn} \approx \frac{Lun}{Lvn} \quad (1)$$

For example, regarding the coil resistance Run (for example, 10 mΩ) of the motor 31 and the angular frequency ω(for example, 2π×40×10³ rad/sec), the coil resistance Run (=10×10⁻³Ω)<<the impedance ω·Lun(=18100×10⁻³Ω). As shown in Equation (1), the coil resistance Run may be disregarded.

Since the impedances Zun and Zvn are relatively large with respect to the voltage of the battery 71, the magnitude of the current (for example, about 0.1 A) supplied to the U-phase and V-phase stator coils 64a becomes relatively smaller. Then, since the rectangular wave is applied between the phase terminals of the motor 31 at the rotary angle estimation time, an occurrence of unnecessary torque is prevented from the motor 31.

The rotary angle estimator 89 selects one estimate value from two values of the rotary angle θm (for example, θ1 and θ3) selected on the basis of the second map by use of the steering torque Tq output from the steering torque sensor 40.

Since the two estimate value candidates of the rotary angle θm (for example, θ1 and θ3) selected on the basis of the second map have a phase difference of 180° in the electric angle (edeg), the field directions of the rotor 63 corresponding to the values (for example, θ1 and θ3), that is, the magnetic-pole directions are opposite to each other.

For this reason, when the current is supplied to the motor 31 in the same manner at the two estimate value candidates (for example, θ1 and θ3), one is used to assist the driver's steering torque so that the assisting torque of the motor 31 is generated in the same direction as the driver's steering direction, and the other is used to reduce the driver's steering torque so that the assisting torque of the motor 31 is generated in a direction opposite to the driver's steering direction. Accordingly, it is possible to determine whether or not the estimate value candidate is appropriate by observing the steering torque.

Figure 10:
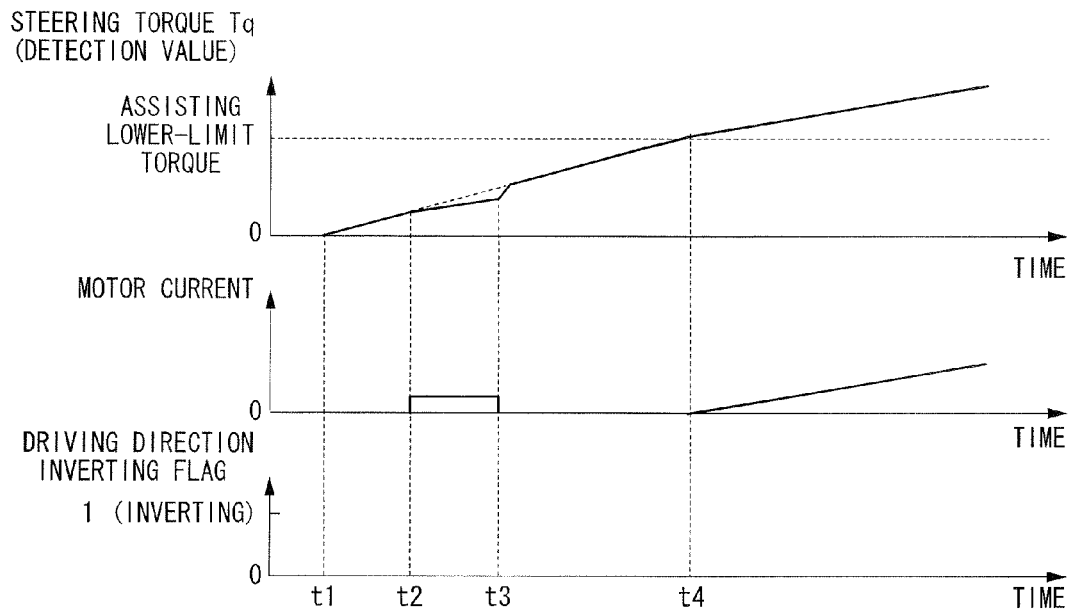
FIG. 10 is a graph showing an example of a variation of a flag value of a driving direction inverting flag, a motor current, and a steering torque Tq according to the embodiment of the present invention.
Figure 11:
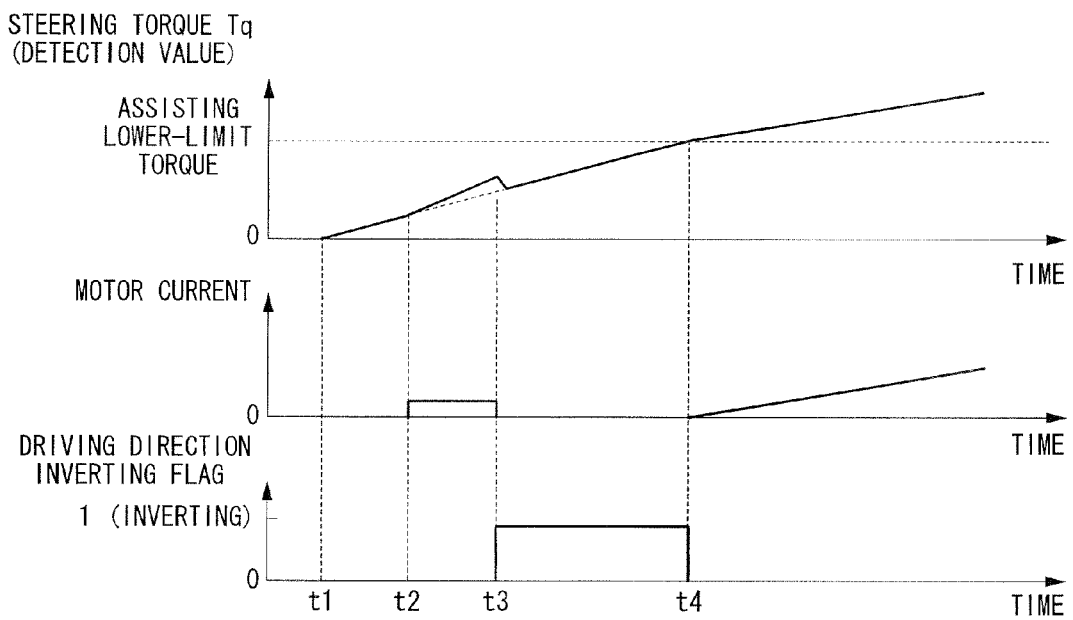
FIG. 11 is a graph showing an example of a variation of a flag value of a driving direction inverting flag, a motor current, and a steering torque Tq according to the embodiment of the present invention.

For example, as shown in the time chart shown in FIG. 10 or 11, during a period when the steering torque Tq detected by the steering torque sensor 40 is zero (that is, a period before a time t1), the motor 31 is in a stationary state, and the rotary angle estimator 89 obtains two estimate value candidates (for example, θ1 and θ3) as the rotary angle θm based on the first map and the second map. Here, the rotary angle estimator 89 selects one (for example, θ1) of the two estimate value candidates (for example, θ1 and θ3) of the rotary angle θm as the estimate value (temporary estimate value) of the so-called temporary rotary angle θm. In the example shown in FIG. 10 or 11, the motor 31 is in a stationary state during a period when the detected steering torque Tq is zero. In the same manner, the motor is in a stationary state even when the minute torque is generated.

For example, as shown in a state after the time t1 shown in FIG. 10 or 11, the steering torque Tq detected by the steering torque sensor 40 in accordance with the driver's steering input starts to increase from zero. Then, the rotary angle estimator 89 allows the steering assisting force of the motor 31 to be generated in the same direction as the driver's steering direction in accordance with the rotary angle θm, and outputs the command signal Vsb to the PWM signal generating section 87 so as to allow a predetermined minute current to be supplied temporarily (a period from the time t2 to t3) to the motor 31 via the FET bridge 72.

The predetermined minute current is supplied in a state where the steering torque Tq detected by the steering torque sensor 40 is not more than a predetermined steering lower-limit torque (assisting dead band) (for example, a period from the t1 to t4 shown in FIG. 10 or 11).

For example, as shown in a period from the time t2 to t3 shown in FIG. 10 or 11, the predetermined minute current (motor current) is supplied to the motor 31. Accordingly, for example, as shown in FIG. 10, in a case where an increased speed of the steering torque Tq detected by the steering torque sensor 40 reduces or the steering torque Tq reduces, the steering assisting torque of the motor 31 is generated in the same direction as the driver's steering direction. Then, the rotary angle estimator 89 determines that the temporary estimated value of the rotary angle θm (for example, θ1) is appropriately set, and sets the temporary estimated value (for example, θ1) as the estimated value of the rotary angle θm when the motor 31 is in a stationary state before the supply of the predetermined minute current.

Meanwhile, as shown in FIG. 11, the predetermined minute current (motor current) is supplied to the motor 31. Accordingly, in a case where the increased speed of the steering torque Tq detected by the steering torque sensor 40 increases, the assisting torque of the motor 31 is generated in a direction different from (i.e., opposite to) the driver's steering direction. Then, it is determined that the temporary estimated value of the rotary angle θm (for example, θ1) is not appropriately set, and it is determined that the other (for example, θ3) of the two values of the rotary angle θm (for example, θ1 and θ3) needs to be appropriately set as the estimated value of the rotary angle θm instead of the temporary estimated value (for example, θ1). For example, as shown in the state after the time t3 shown in FIG. 11, a flag value of a driving direction inverting flag for inverting the driving direction of the motor 31 is set to "1", and the other (for example, θ3) of the two values of the rotary angle θm (for example, θ1 and θ3) is set as the estimated value of the rotary angle θm of the motor 31 being in a stationary state before the supply of the predetermined minute current.

For example, as shown in the state after the time t4 shown in FIG. 10 or 11, the rotary angle estimator 89, the U-interphase voltage Vun or the V-interphase voltage Vvn increases more than a predetermined value due to an induced voltage caused by the rotation of the motor 31 in a driving state where the rotary speed ωm of the motor 31 is not less than a predetermined speed. For this reason, in this case, it is estimated that the motor 31 is in a rotary state, and the rotary angle θm is estimated on the basis of the induced voltage varying in accordance with the magnetic-pole position of the rotor 63. The detailed description thereof will be omitted.

At this time, the rotary speed calculating section 90 calculates the rotary speed ωm(=dθm/dt) from the rotary angle θm output from the rotary angle estimator 89.

The three-phase-dq converting section 91 calculates the rotary coordinate of the rotary phase of the motor 31, that is, the d-axis current Id and the q-axis current Iq in the d-q coordinate based on the detection signals of the phase currents Iu and Iw detected by the current sensors 76 and 76, that is, the U-phase detection current Ius, the W-phase detection current Iws, and the rotary angle θm output from the rotary angle estimator 89.

The electric steering system 1 according to the embodiment has the above-described configuration. Next, an operation of the electric steering system 1 will be described, that is, a process will be described in which the rotary angle θm of the motor 31 in a stationary state is estimated.

Figure 12:
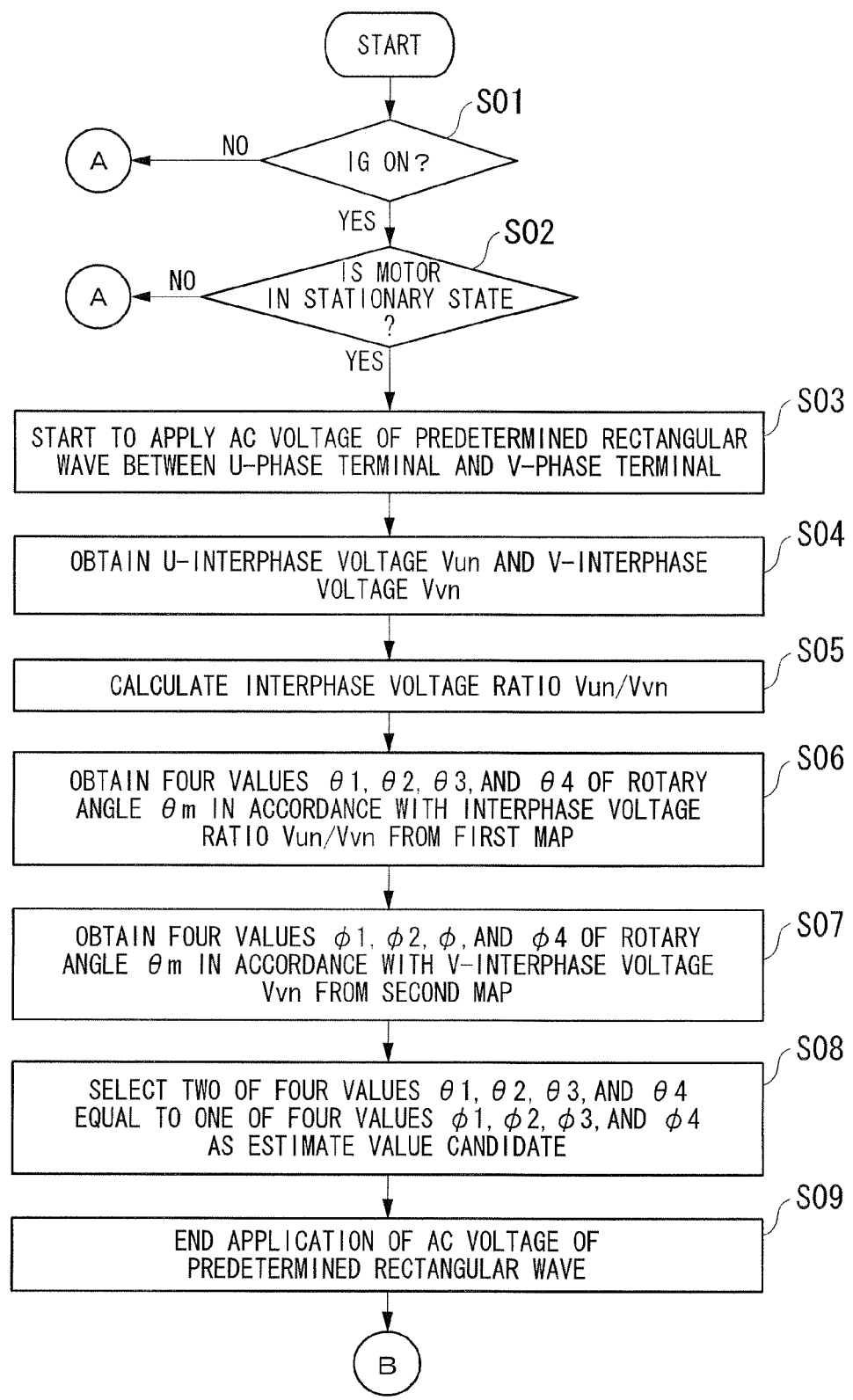
FIG. 12 is a flowchart showing an operation of the electric steering system according to the embodiment of the present invention, that is, a process for estimating a rotary angle θm upon starting a motor in a stationary state.
Figure 13:
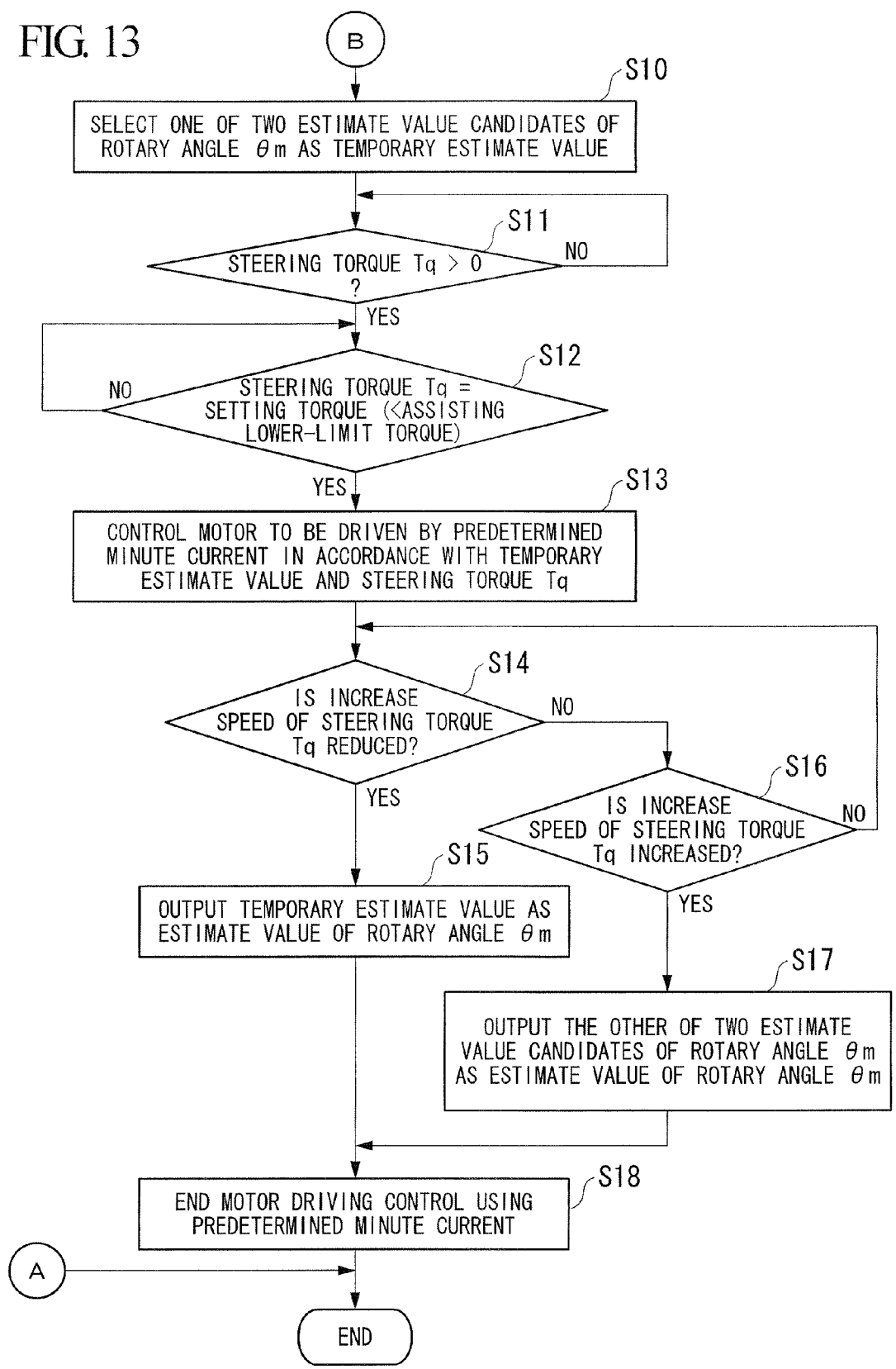
FIG. 13 is a flowchart showing an operation of the electric steering system according to the embodiment of the present invention, that is, a process for estimating a rotary angle θm upon starting a motor in a stationary state.

First, for example, in Step S01 shown in FIG. 12, it is determined whether or not an ignition switch of a vehicle is turned on (IG_ON).

When the determination result is "YES", the process advances to Step S02.

On the other hand, when the determination result is "NO", the process does not advance.

In Step S02, it is determined whether or not the motor 31 is in a stationary state.

For example, as described above, since an induced voltage is not generated by the rotation of the motor 31 when the U-interphase voltage Vun or the V-interphase voltage Vvn is smaller than a predetermined value, it is determined that the motor 31 is in a stationary state.

When the determination result is "NO", the process advances to the END, and then a series of processes ends.

On the other hand, when the determination result is "YES", the process advances to Step S03.

In Step S03, an AC voltage of a predetermined rectangular wave starts to be applied between the phase terminals of the motor 31 (for example, between the U-phase terminal and the V-phase terminal).

In Step S04, the U-interphase voltage Vun(=Vu−Vn) and the V-interphase voltage Vvn(=Vv−Vn) are obtained on the basis of the middle-point voltage Vn and the phase output voltages Vu and Vv detected by the voltage sensors 77.

In Step S05, the interphase voltage ratio Vun/Vvn is calculated.

In Step S06, four values θ1, θ2, θ3, and θ4 of the rotary angle θm are obtained by searching the first map based on the interphase voltage ratio Vun/Vvn.

In Step S07, four values φ1, φ2, φ3, and φ4 of the rotary angle θm are obtained by searching the second map based on the V-interphase voltage Vvn.

In Step S08, two of the four values θ1, θ2, θ3, and θ4 equal to one of the four values φ1, φ2, φ3, and φ4 are selected as the estimate value candidates.

In Step S09, the application of the AC voltage of the predetermined rectangular wave ends.

In Step S10, one of the two estimate value candidates of the rotary angle θm is selected as a temporary estimated value.

In Step S11, it is determined whether or not the steering torque Tq detected by the steering torque sensor 40 is larger than zero.

When the determination result is "NO", the determination process in Step S11 is repeated.

On the other hand, when the determination result is "YES", that is, the driver's steering input starts, the process advances to Step S12.

In Step S12, it is determined whether or not the steering torque Tq is a predetermined setting torque smaller than the steering lower-limit torque.

When the determination result is "YES", the process advances to Step S13.

On the other hand, when the determination result is "NO", the determination process in Step S12 is repeated.

In Step S13, the motor 31 is controlled to be driven by a predetermined minute current via the FET bridge 72 so that the steering assisting force of the motor 31 is made to be applied in the same direction as the driver's steering direction in accordance with the temporary estimated value of the rotary angle θm and the steering torque Tq detected by the steering torque sensor 40.

In Step S14, it is determined whether or not an increased speed of the steering torque Tq detected by the steering torque sensor 40 reduces due to the supply of the predetermined minute current to the motor 31.

When the determination result is "NO", the process advances to Step S16 described below.

On the other hand, when the determination result is "YES", it is determined that the temporary estimated value of the rotary angle θm is appropriately set, and the process advances to Step S15. In Step S15, the temporary estimated value of the rotary angle θm is set as the estimated value of the rotary angle θm of the motor 31 in a stationary state before the supply of the predetermined minute current, and the process advances to Step S18 described below.

In Step S16, it is determined whether or not an increased speed of the steering torque Tq detected by the steering torque sensor 40 increases due to the supply of the predetermined minute current to the motor 31.

When the determination result is "NO", the process returns to Step S14 described above.

On the other hand, when the determination result is "YES", it is determined that the temporary estimated value of the rotary angle θm is not appropriately set, and the process advances to Step S17. In Step S17, the other of the two estimated value candidates is set as the estimated value of the rotary angle θm of the motor 31 in a stationary state before the supply of the predetermined minute current. This corresponds to the above-described driving direction inverting flag.

In Step S18, the driving control of the motor 31 using the predetermined minute current ends, and a series of the process ends.

As described above, according to the electric steering system 1 according to the embodiment, at the rotary angle estimation time of the motor 31 in a stationary state, the rotary angle θm is estimated on the basis of the variation of the ratio between the interphase voltages Vun and Vvn corresponding to the variation of the interphase inductances Lun, Lvn, and Lwn. For this reason, it is possible to more reliably detect the variation than a case in which the rotary angle is directly estimated from the interphase voltage or the line voltage, thereby improving the estimation precision. For example, it is possible to further improve the estimation precision of the rotary angle θm than a case in which the rotary angle θm is estimated in accordance with the current variation corresponding to the variation of the interphase inductance Lun, Lvn, and Lwn of the motor 31. Additionally, since the rotary angle θm is estimated on the basis of the interphase voltage ratio Vun/Vvn, for example, even when errors of the interphase voltages Vun and Vvn increase due to the unstable variation of the output voltage of the battery 71, it is possible to cancel the errors of the interphase voltages Vun and Vvn in the interphase voltage ratio Vun/Vvn, and thus to further improve the estimation precision of the rotary angle θm.

Also, since the rotary angle θm is not estimated using the current response, even when a voltage of a predetermined rectangular wave of a frequency except for an audio frequency is applied between the phase terminals (for example, the U-phase terminal and the V-phase terminal) of the motor 31, it is possible to estimate the rotary angle θm with high precision without deteriorating a resolution, and thus to ensure desired low noise.

For example, since it is possible to simplify the configuration of the apparatus and to decrease the size of the apparatus without a rotary angle sensor such as a resolver, it is possible to facilitate a vehicle mounting operation. Also, since it is possible to reduce an overhang (for example, a distance with respect to the pinion shaft 11) of the motor 31 with respect to the housing 6 constituting the steering gear box, it is possible to reduce a moment when the housing 6 is applied with a vibration generated upon driving the motor 31, and thus to reduce the vibration generated upon driving the motor 31. Since it is possible to reduce noise upon estimating the rotary angle of the motor 31 and to improve estimation precision of the rotary angle, it is possible to prevent a case in which the driver feels discomfort when steering.

When the field direction, that is, the magnetic-pole direction of the rotor 63 is determined, one (for example, θ1) of two estimated value candidates of the rotary angle θm (for example, θ1 and θ3) selected on the basis of the second map is set as the estimated value (temporary estimated value) of the so-called temporary rotary angle θm. Since the determination is carried out in accordance with the steering torque detected by the steering torque sensor 40 at a driving control time when the motor 31 is controlled to be driven by a predetermined minute current in accordance with the temporary estimated value, it is possible to reduce a time necessary for estimating the rotary angle θm by preventing a complex process for determining the field direction, that is, the magnetic-pole direction of the rotor 63.

Accordingly, since it is possible to improve the response upon starting the motor 31, it is possible to appropriately assist the driver's steering input by using the steering assisting force generated from the motor 31 without an excessive response delay.

Additionally, since it is determined whether or not the estimated value (temporary estimated value) of the temporary rotary angle θm is appropriately selected on the basis of the steering torque Tq detected by the steering torque sensor 40 provided in the electric steering system 1, it is possible to prevent the complex configuration of the apparatus without, for example, requiring a new component to be configured.

Since the motor 31 is controlled to be driven by the predetermined minute current in accordance with the estimated value (temporary estimated value) of the temporary rotary angle θm, it is not necessary to supply the excessively large current, which causes the saturation of the magnetic circuit, in order to determine the polarity of the magnetic pole of the rotor 63 like the related art, and thus to prevent an occurrence of the excessive unnecessary torque exceeding a predetermined assisting lower-limit torque. Accordingly, it is possible to prevent a case in which the driver feels discomfort due to an occurrence of the vibration and noise or the undesired steering torque.

Figure 14:
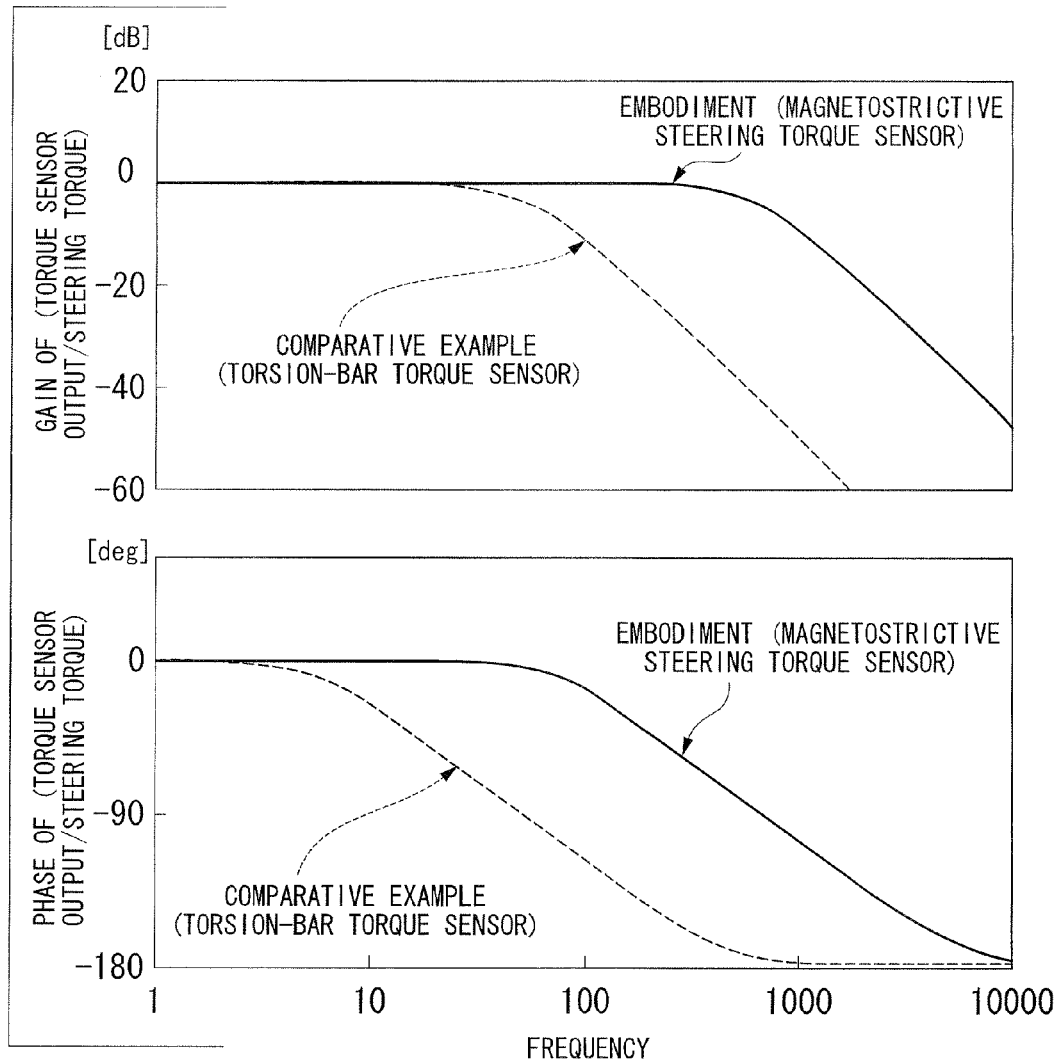
FIG. 14 is a graph showing an example of a correspondence relationship of a gain and a phase of a torsion-bar torque sensor and a magnetostrictive torque sensor according to the embodiment of the present invention with respect to a frequency.

In this invention, since the steering torque sensor 40 is configured as a magnetostrictive steering torque sensor, the steering torque sensor 40 has larger rigidity than that of a torsion-bar torque sensor or the like for detecting torsion of a torsion bar connecting the input side to the output side of the steering shaft 3. As shown in FIG. 14, according to the comparison with the torsion-bar torque sensor, a phase delay and a gain reduction hardly occur up to the high frequency. Accordingly, since the sensitivity of the torque detection with respect to the variation of the steering torque Tq is improved, it is possible to improve the phase delay. Accordingly, even when the motor 31 is controlled to be driven by a predetermined minute current, it is possible to detect the steering torque Tq with high precision without the delay of the steering torque Tq and to estimate the rotary angle θm with high precision without a delay. As a result, the driver does not feel any discomfort.

The above-described embodiment has described a case in which the rotary angle estimator 89 estimates two estimated value candidates (for example, θ1 and θ3) of the rotary angle θm based on the interphase voltage ratio Vun/Vvn, but the invention is not limited thereto. For example, the two estimated value candidates (for example, θ1 and θ3) of the rotary angle θm may be estimated on the basis of the line voltage ratio Vuv/Vwu.

Figure 15:
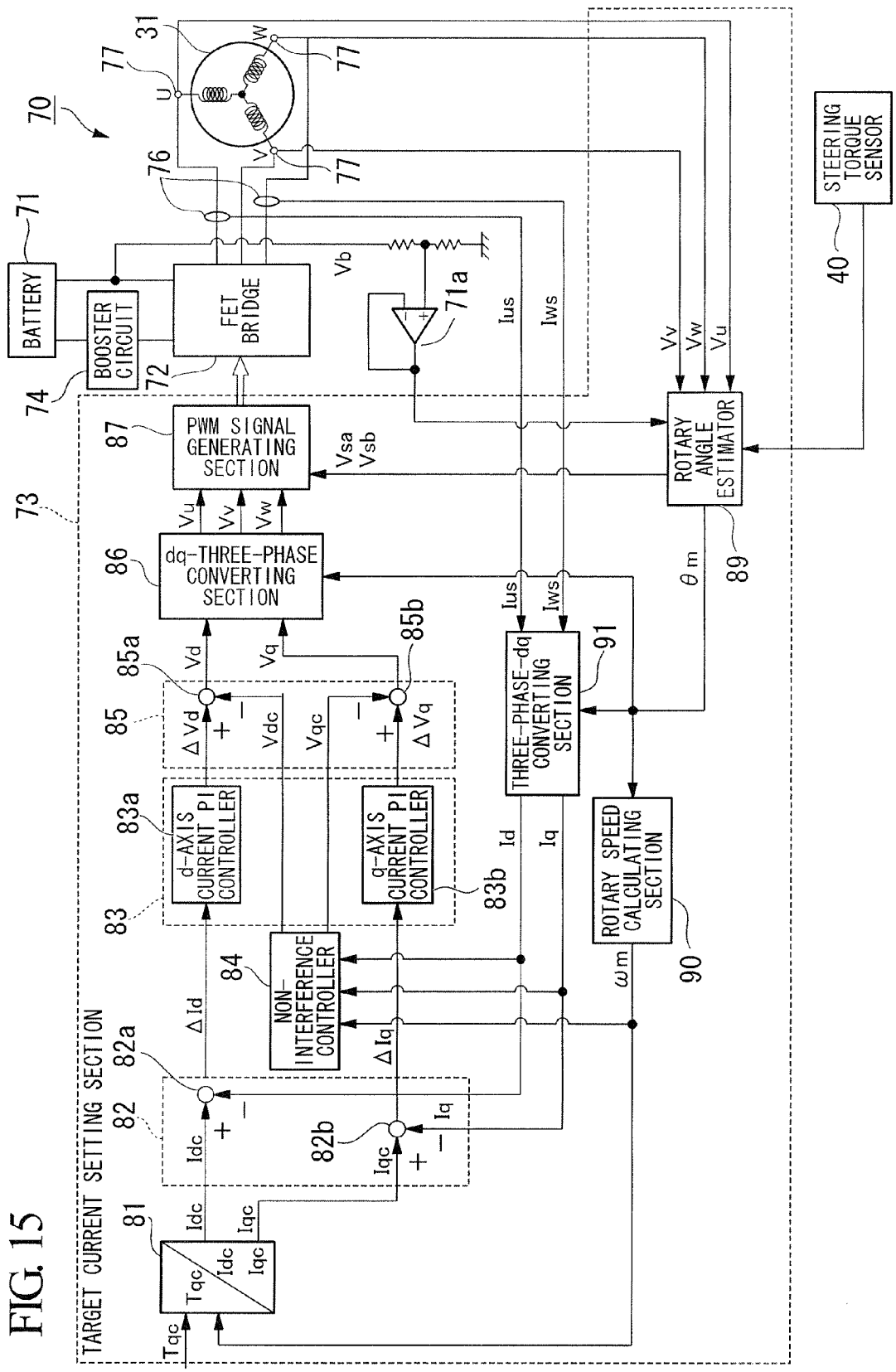
FIG. 15 is a configuration diagram showing the control device of the brushless motor according to a modified example of the embodiment of the present invention.

In the control device 70 of the brushless motor according to the modified example, for example, as shown in FIG. 15, the rotary angle estimator 89 receives the detection signal output from the voltage sensor 77 for detecting the phase output voltages Vu, Vv, and Vw.

The rotary angle estimator 89 calculates the line voltages Vuv(=Vu−Vv) and Vwu(=Vw−Vu), and obtains the rotary angle θm by searching a third map showing a predetermined correspondence relationship between the line voltage ratio Vuv/Vwu and the rotary angle θm, which is because the line voltage ratio Vuv/Vwu is substantially equal to the line inductance ratio Luv/Lwu.

The third map is, for example, a map showing a predetermined correspondence relationship between the line voltage ratio Vuv/Vwu and the rotary angle θm. Four values α1, α2, α3, and α4 of the rotary angle θm correspond to the appropriate single value of the line voltage ratio Vuv/Vwu in the electric angle (edeg) in the range of 0° to 360°. That is, two cycles of the line voltage ratio Vuv/Vwu are set to 360° in the electric angle (edeg).

The rotary angle estimator 89 selects the rotary angle θm by searching a fourth map showing a predetermined correspondence relationship between the line voltage Vwu and the rotary angle θm in order to select two of the four values α1, α2, α3, and α4 of the rotary angle θm obtained by searching the third map.

The fourth map is, for example, a map showing a predetermined correspondence relationship between the line voltage Vwu and the rotary angle θm. Four values β1, β2, β3, and β4 of the rotary angle θm correspond to the appropriate single value of the line voltage Vwu in the electric angle (edeg) in the range of 0° to 360°. That is, two cycles of each of the line voltages Vuv and Vwu are set to 360° in the electric angle (edeg).

Two of the four values β1, β2, β3, and β4 of the rotary angle θm corresponding to the line voltage Vwu equal to two of the four values α1, α2, α3, and α4 of the rotary angle θm obtained by searching the third map are selected as the estimate value candidates.

In order to obtain the accurate rotary angle θm even when the battery voltage (i.e., the power source voltage of the FET bridge 72) varies, the battery voltage Vb is detected, the line voltage Vwu is corrected using the battery voltage Vb, and the fourth map is searched using the corrected line voltage Vwu, thereby obtaining the four values β1, β2, β3, and β4 of the rotary angle θm. For example, as shown in FIG. 15, the voltage follower circuit 71a having the operational amplifier is provided between the rotary angle estimator 89 and the battery 71 (+B), and the output of the voltage follower circuit 71a is input to the rotary angle estimator 89.

For example, as shown in the following Equation (2), the magnitude of the line voltages Vuv(=Vu−Vv), Vvw(=Vv−Vw), and Vwu(=Vw−Vu) according to the modified example is √3 and the phase thereof is delayed by π/6 with respect to the interphase voltages Vun, Vvn, and Vwn according to the above-described embodiment.

[Equation 2]

$$\begin{aligned} Vuv &= \sqrt{3} \times Vun \times \varepsilon^{-j\frac{\pi}{6}} \\ Vvw &= \sqrt{3} \times Vvn \times \varepsilon^{-j\frac{\pi}{6}} \\ Vwu &= \sqrt{3} \times Vwn \times \varepsilon^{-j\frac{\pi}{6}} \end{aligned} \quad (2)$$

In the above-described embodiment, the rotary angle estimator 89 sets the flag value of the driving direction inverting flag to "1" when it is determined that the temporary estimated value of the rotary angle θm (for example, θ1) is appropriately set upon supplying a predetermined minute current to the motor 31, and sets the other (for example, θ3) of two estimated value candidates (for example, θ1 and θ3) of the rotary angle θm selected on the basis of the second map as the estimate value of the rotary angle θm of the motor 31 being in a stationary state before the supply of the predetermined minute current. However, the invention is not limited thereto, but for example, even when it is determined that the temporary estimated value of the rotary angle θm (for example, θ1) is not appropriately set, the temporary estimated value may be set to the estimated value of the rotary angle θm of the motor 31 being in a stationary state before the supply of the predetermined minute current. Then, as shown in FIGS. 10 and 11, the flag value of the driving direction inverting flag is set to "1", and the assisting torque generating direction may be inverted without changing the magnitude of the assisting torque upon generating the assisting torque of the motor 31 in accordance with the steering torque Tq after a time when the steering torque Tq detected by the steering torque sensor 40 is not less than the predetermined assisting lower-limit torque.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electric steering system comprising:
    a steering torque detection unit which detects a steering torque acting on the shaft;
    a brushless motor which includes a rotor and a stator having multi-phase stator coils, and generates an assisting torque for assisting the steering torque;
    a current supply switching unit which drives the brushless motor by switching a current supply between each phase stator coil;
    a rotary angle estimation unit which estimates a rotary angle of the rotor of the brushless motor and outputs an estimated rotary angle;
    a determination unit which determines whether the estimated rotary angle is appropriate by comparison with a direction of the steering torque detected by the steering torque detection unit; and
    a steering control unit which drives the brushless motor in accordance with the estimated rotary angle determined to be appropriate by the determination unit to control generation of the assisting torque, wherein
    the determination unit which determines whether the estimated rotary angle is appropriate by determining whether a steering direction input by a driver is the same as a direction of the assisting torque output from the brushless motor.

2. The electric steering system according to claim 1, further comprising:
    a state quantity detection unit which detects a predetermined state quantity involved with an inductance of the brushless motor, wherein
    the rotary angle estimation unit includes:
    a rotary angle candidate estimation section which estimates a plurality of rotary angle candidates as the rotary angle of the rotor based on the predetermined state quantity detected by the state quantity detection unit; and
    a selection section which selects one of the plurality of rotary angle candidates estimated by the rotary angle candidate estimation section as the estimated rotary angle.

3. The electric steering system according to claim 2, wherein the state quantity detection unit includes:
    a voltage application section which applies a predetermined AC voltage to each multi-phase stator coil; and
    a voltage detection section which detects a line voltage or an interphase voltage of each phase, and detects the predetermined state quantity based on a ratio of the line voltages or a ratio of the interphase voltage detected by the voltage detection section in a state where the predetermined AC voltage is applied to each multi-phase stator coil by the voltage application section.

4. The electric steering system according to claim 1, wherein the determination unit controls driving of the brushless motor in a state where the steering torque detected by the steering torque detection unit is less than or equal to a predetermined torque.

5. The electric steering system according to any one of claims 1 to 4, wherein the steering torque detection unit is a magnetostrictive torque sensor.

* * * * *